(12) United States Patent
Qi et al.

(10) Patent No.: US 11,239,614 B2
(45) Date of Patent: Feb. 1, 2022

(54) SOFA USB SOCKET

(71) Applicant: HUIZHOU UPSPRING INTELLIGENT TECHNOLOGY CO., LTD, Guangdong (CN)

(72) Inventors: Fayun Qi, Guangdong (CN); Zuochao Peng, Guangdong (CN); Dinglue Chen, Guangdong (CN); Dazhuan Tang, Guangdong (CN); Zeming Sun, Guangdong (CN); Zilong Li, Guangdong (CN)

(73) Assignee: HUIZHOU UPSPRING INTELLIGENT TECHNOLOGY CO., LTD, Huizhou (CN)

( * ) Notice: Subject to any disclaimer, the term of this patent is extended or adjusted under 35 U.S.C. 154(b) by 113 days.

(21) Appl. No.: 16/749,198

(22) Filed: Jan. 22, 2020

(65) Prior Publication Data

US 2020/0161814 A1    May 21, 2020

Related U.S. Application Data

(63) Continuation of application No. PCT/CN2019/089896, filed on Jun. 3, 2019.

(30) Foreign Application Priority Data

Jun. 4, 2018   (CN) .......................... 201820856681.5
Mar. 22, 2019  (CN) .......................... 201920376120.X

(51) Int. Cl.
*H01R 13/66*   (2006.01)
*H01R 13/703*  (2006.01)
*H01R 13/713*  (2006.01)

(52) U.S. Cl.
CPC ....... *H01R 13/703* (2013.01); *H01R 13/6625* (2013.01); *H01R 13/6633* (2013.01);
(Continued)

(58) Field of Classification Search
CPC . G06F 13/364; H01R 13/703; H01R 13/6625; H01R 13/6633; H01R 13/6641;
(Continued)

(56) References Cited

U.S. PATENT DOCUMENTS 7,356,715 B2 *  4/2008  Okayasu ................. G06F 1/266
                                                    710/300
8,156,349 B2 *  4/2012  Nagamine ........... G06F 13/4282
                                                    713/300

(Continued)

*Primary Examiner* — Thanh Tam T Le

(57) ABSTRACT

The present invention discloses a sofa USB socket including: a USB female socket including a tongue core, wherein the tongue core includes 5 pins, and the fifth pin is an ID pin; and a USB circuit including a power circuit, a filter circuit, a control chip and a buck chopper circuit, wherein the buck chopper circuit includes a transistor, and the ID pin is electrically connected with the transistor. When an external USB male plug is inserted into the USB female socket, the power circuit supplies power to the USB female socket; when the USB female socket is in an unloaded state, the fifth pin is suspended, the control chip enters a sleep state, and the USB female socket has no output voltage, which greatly reduces the no-load energy consumption, thereby being beneficial to extending the endurance time and the service life of a power supply battery.

14 Claims, 6 Drawing Sheets

(52) U.S. Cl.
CPC ..... *H01R 13/6641* (2013.01); *H01R 13/6675* (2013.01); *H01R 13/6683* (2013.01); *H01R 13/713* (2013.01)

(58) Field of Classification Search
CPC ............ H01R 13/6675; H01R 13/6683; H01R 13/713; H01R 13/6616; H01R 13/68; H01R 23/025; H01R 12/58; H05K 3/308
See application file for complete search history.

(56) References Cited

U.S. PATENT DOCUMENTS

| | | | | |
|---|---|---|---|---|
| 8,539,266 B2* | 9/2013 | Kawano | ................. | G06F 1/266 |
| | | | | 713/300 |
| 8,864,527 B2* | 10/2014 | Kwon | .................... | G06F 1/266 |
| | | | | 439/638 |
| 8,882,526 B2* | 11/2014 | Li | ......................... | H01R 13/62 |
| | | | | 439/345 |
| 8,949,631 B2* | 2/2015 | Chen | ....................... | G06F 1/266 |
| | | | | 713/300 |
| 9,207,697 B2* | 12/2015 | Tung | .................... | G06F 13/385 |
| 9,318,854 B2* | 4/2016 | Chang | ................. | H01R 13/703 |
| 9,325,123 B2* | 4/2016 | Yu | ....................... | H01R 13/7033 |

* cited by examiner

SOFA USB SOCKET

CROSS REFERENCE TO RELATED APPLICATIONS

The present application is a Continuation Application of PCT Application No. PCT/CN2019/089896 filed on Jun. 3, 2019, which claims the benefit of Chinese Patent Application No. 201820856681.5 filed on Jun. 4, 2018 and the benefit of Chinese Patent Application 201920376120.X filed on Mar. 22, 2019. All the above are hereby incorporated by reference.

FIELD OF THE INVENTION

The present invention relates to the technical field of sofa control, in particular to a USB socket applied to a sofa.

BACKGROUND OF THE INVENTION

A USB socket is a universal socket with a USB interface, which includes a socket main body and a USB female socket arranged on the socket main body, and when a plug on a charging wire connected to a to-be-charged terminal/device is inserted into the USB female plug, the USB socket charges the to-be-charged terminal/device.

It is discovered in practice that, for a traditional USB socket, whether or not a plug is inserted into the USB socket, the traditional USB socket is in a continuous power supply state, that is, the traditional USB socket cannot achieve automatic power off in an unloaded state. Taking a USB socket applied to a smart sofa as an example, the use frequency of the USB socket is not high, if the USB socket is in the continuous power supply state, this will cause unnecessary power consumption, which shortens the endurance time and the service life of a power supply battery in the smart sofa.

SUMMARY OF THE INVENTION

The technical problem to be solved by the present invention is to provide a USB socket applied to a sofa, which can effectively reduce unnecessary power consumption, thereby being beneficial to extending the endurance time and the service life of a power supply battery.

In order to solve the above technical problem, the present invention discloses a USB socket. The USB socket includes:

a USB female socket, wherein the USB female socket includes a tongue core, the tongue core includes 5 pins, and the fifth pin contained in the tongue core is an ID pin; and a USB circuit, wherein the USB circuit includes a power circuit, a filter circuit, a control chip and a step-down chopper circuit, the step-down chopper circuit includes a transistor, and the ID pin is electrically connected with the transistor.

Further, the filter circuit is a π-type filter circuit composed of an inductor and a capacitor.

Further, transient diodes are arranged at both ends of the filter circuit.

Further, the control chip includes an enable pin, and the transistor is a PNP transistor, wherein:

an emitter of the PNP transistor is electrically connected with the enable pin, a base of the PNP transistor is electrically connected with the ID pin, and a collector of the PNP transistor is used for grounding.

Further, the power circuit is used for electrically connecting with an external adapter or a power supply battery, and the external adapter or the power supply battery is used for supplying power to the power circuit.

Further, the power circuit includes a diode and a fuse.

Further, the supply voltage of the t power supply battery is 30V.

Further, the USB socket is applied to a smart sofa hand controller.

Further, the USB female socket further includes an outer shell, and the outer shell surrounds the tongue core; and the ID pin includes a head portion and a pin portion, the pin portion is electrically connected with the control chip, when a USB male plug is inserted into the USB female socket, the head portion is in contact with an adjacent pin of the ID pin, and the pin portion is electrically connected with the transistor.

Further, the tongue core is provided with a groove, and the head portion is embedded in the groove.

Further, the adjacent pin is a GND pin.

Further, the head portion is partially exposed from a front end of the tongue core.

Further, the adjacent pin includes a spring leaf, and when the USB male plug is inserted into the USB female socket, the head portion is in contact with the spring leaf.

Further, the spring leaf is arranged above the head portion.

Compared with the prior art, the present invention has the following beneficial effects:

In the present invention, the USB socket includes the USB female socket, the USB female socket includes the tongue core, the tongue core includes 5 pins, and the fifth pin contained in the tongue core is an ID pin; and the USB circuit, the USB circuit includes the power circuit, the filter circuit, the control chip and the step-down chopper circuit, the step-down chopper circuit includes the transistor, and the ID pin is electrically connected with the transistor. Therefore, when the external USB male plug is inserted into the USB female socket, the power circuit supplies power to the USB female socket; when the USB female socket is in an unloaded state, the fifth pin of the USB female socket is suspended, the control chip enters a sleep state, the USB female socket has no output voltage, which greatly reduces the no-load energy consumption and is conducive to reducing the power consumption, thereby being beneficial to extending the endurance time and the service life of a power supply battery pack.

BRIEF DESCRIPTION OF THE DRAWINGS

To illustrate technical solutions in the embodiments of the present invention more clearly, a brief introduction on the drawings is given below. Apparently, the drawings in the description below are merely some of the embodiments of the present invention, based on which other drawings can be obtained by those of ordinary skill in the art without any creative effort.

Figure 1:
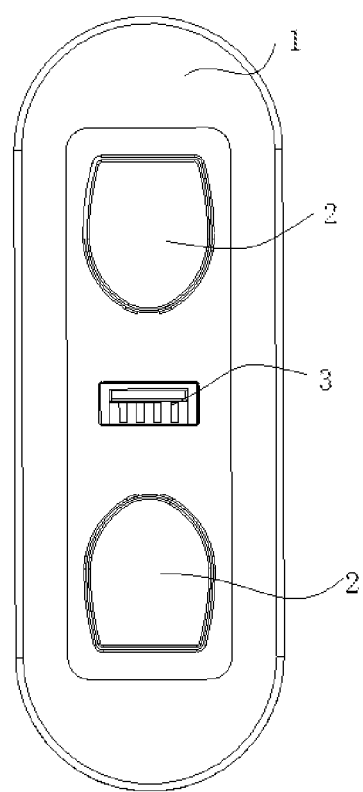
FIG. 1 is a planar graph of a smart sofa hand controller.

wherein reference signs are as follows:

housing 1, two buttons 2, USB socket 3, outer shell 11, tongue core 12, grounding pin 121, control pin (also known as an ID pin) 122, pin portion 1211 of the grounding pin, spring leaf 1212, pin portion 1221 of the control pin, and head portion 1222 of the control pin.

DETAILED DESCRIPTION OF ILLUSTRATED EMBODIMENTS

Specific embodiments are given below, and the specific embodiments of the present invention are further illustrated below in combination with the drawings.

Figure 2:
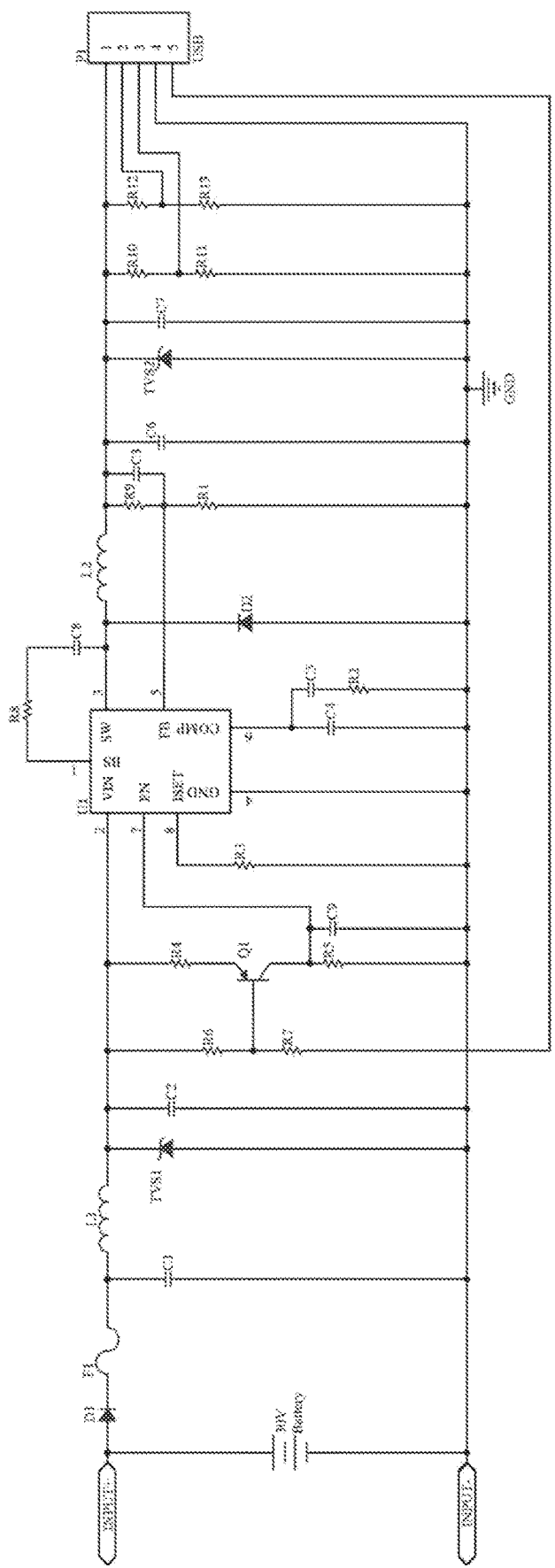
FIG. 2 is a circuit diagram of a USB circuit of a USB socket in the hand controller in FIG. 1.

As shown in FIG. 1 and FIG. 2, a smart sofa hand controller includes a housing 1, two buttons 2 and a USB socket 3, the USB socket 3 includes a USB female socket and a USB circuit, the USB socket 3 is located between the two buttons 2, and the USB circuit includes a power circuit, a filter circuit, a control chip and a step-down chopper circuit, the step-down chopper circuit includes a transistor Q1. The use of components and parts in the circuit can be effectively reduced by using the transistor. The USB female socket has 5 pins, wherein the fifth pin is an ID pin, and the fifth pin is connected with the transistor Q1.

Figure 3:
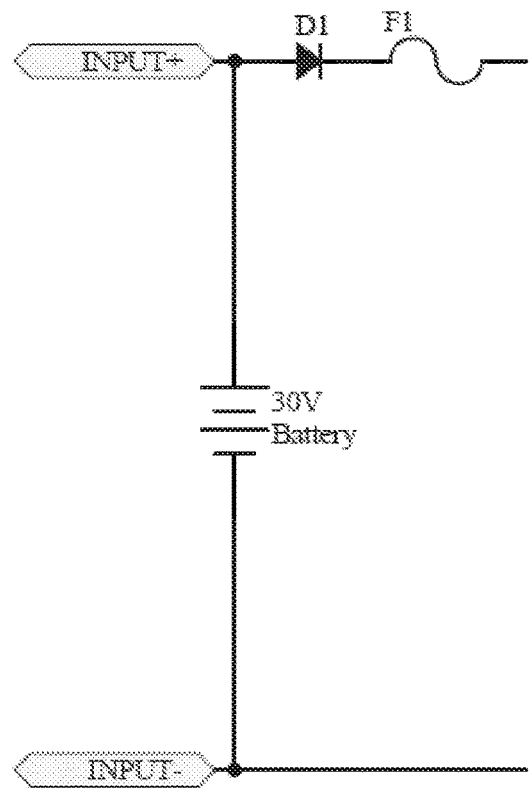
FIG. 3 is a circuit diagram of a power circuit of the USB circuit of the USB socket in the hand controller in FIG. 1.

As shown in FIG. 3, a supply voltage can be provided for the power circuit by an external adapter, and the supply voltage can also be provided by a battery. In general, an electric supply external adapter is used. In the case of power failure, the supply voltage can be provided by the battery, and the supply voltage of the battery is 30V. The positive electrode of the power supply is connected with a diode D1 and a fuse F1, the diode D1 can prevent reverse connection, and the fuse F1 can play an overload protection role on the circuit.

Figure 4:
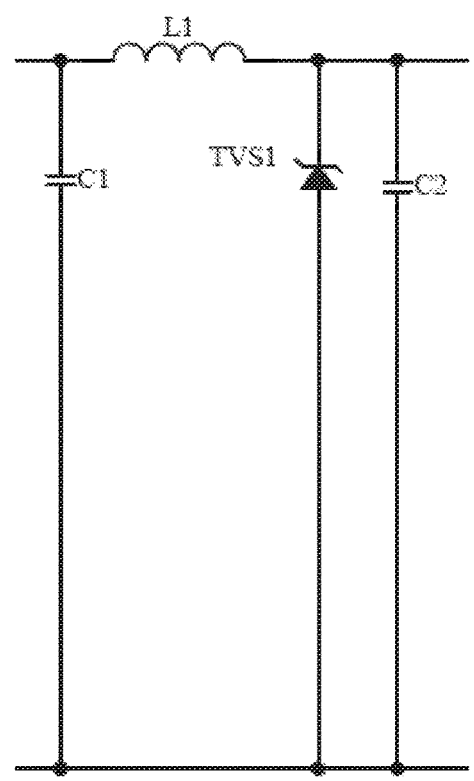
FIG. 4 is a circuit diagram of a π-type filter circuit of the USB circuit of the USB socket in the hand controller in FIG. 1.

As shown in FIG. 4, the filter circuit is a π-type filter circuit composed of a capacitor C1, a capacitor C2 and an inductor L1, the π-type filter circuit can effectively control the interference and noise of the power supply to other electronic products or the interference and noise of the other electronic products to their own power supplies. Transient diodes TVS1 are connected in parallel to both ends of the π-type filter circuit, and components and parts in the circuit can be effectively protected from being damaged by pulse signals by disposing the transient diodes TVS1.

The USB female socket P1 has 5 pins, the first pin and the fourth pin are respectively a positive electrode pin and a grounding pin of the power supply, the second pin and the third pin are respectively positive and negative voltage data pins, and the fifth pin is the ID pin. The transistor Q1 is a PNP transistor, its base b is connected with the fifth pin of the USB female socket P1, an emitter e is connected with an enable pin EN of the control chip U1, and a collector c is grounded.

Figure 5:
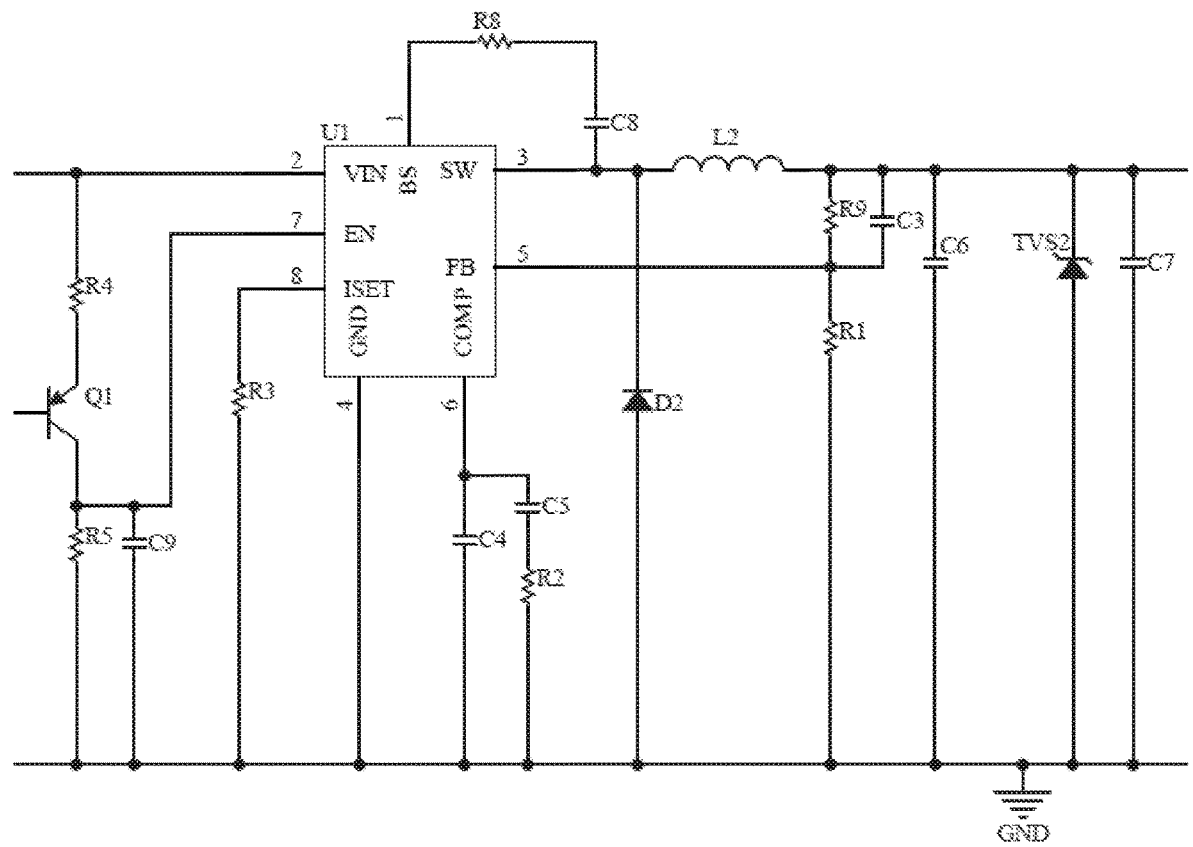
FIG. 5 is a circuit diagram of a step-down chopper circuit and a control chip of the USB circuit of the USB socket in the hand controller in FIG. 1.

As shown in FIG. 5, in the step-down chopper circuit, when the fifth pin of the USB female socket is suspended, the transistor Q1 is in a high level state, the transistor Q1 is in a turned-off state, the enable pin EN of the control chip U1 is turned off, the control chip U1 sleeps, the power circuit does not supply power, and the follow current inductor L2, the capacitor and the diode D2 form a loop; when the fifth pin of the USB female socket is in a low level, the transistor Q1 is turned on, the enable pin EN of the control chip U1 is turned on, the control chip U1 works, the diode D2 is cut off, and the power circuit supplies power to the USB female socket P1, and realizes a step-down function.

The transistor is controlled to turn off or turn on by the fifth pin (in a suspension state or in a low level state) of the USB female socket, so as to control the control chip to work or sleep. The effect that the power circuit does not supply power in the case of no-load of the USB female socket is realized, thereby reducing the no-load power consumption of the USB female socket and being able to extend the service life of the battery of the smart sofa and reduce the power consumption of the smart sofa.

Figure 6:
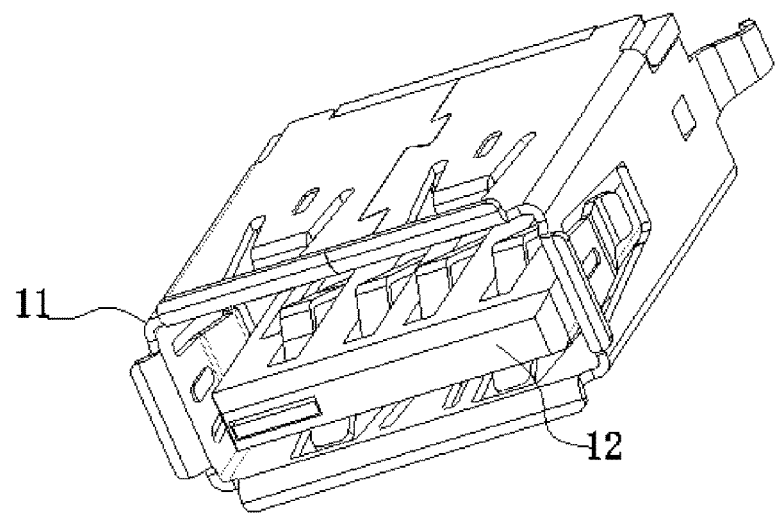
FIG. 6 is a structural schematic diagram of a USB socket disclosed by the present invention.

As shown in FIG. 6, a USB socket includes a USB female socket, the USB female socket includes an outer shell, the outer shell is provided with a connecting piece, and through the connecting piece, the USB socket of the present invention can be installed on an external device, for example, on a smart sofa.

Figure 7:
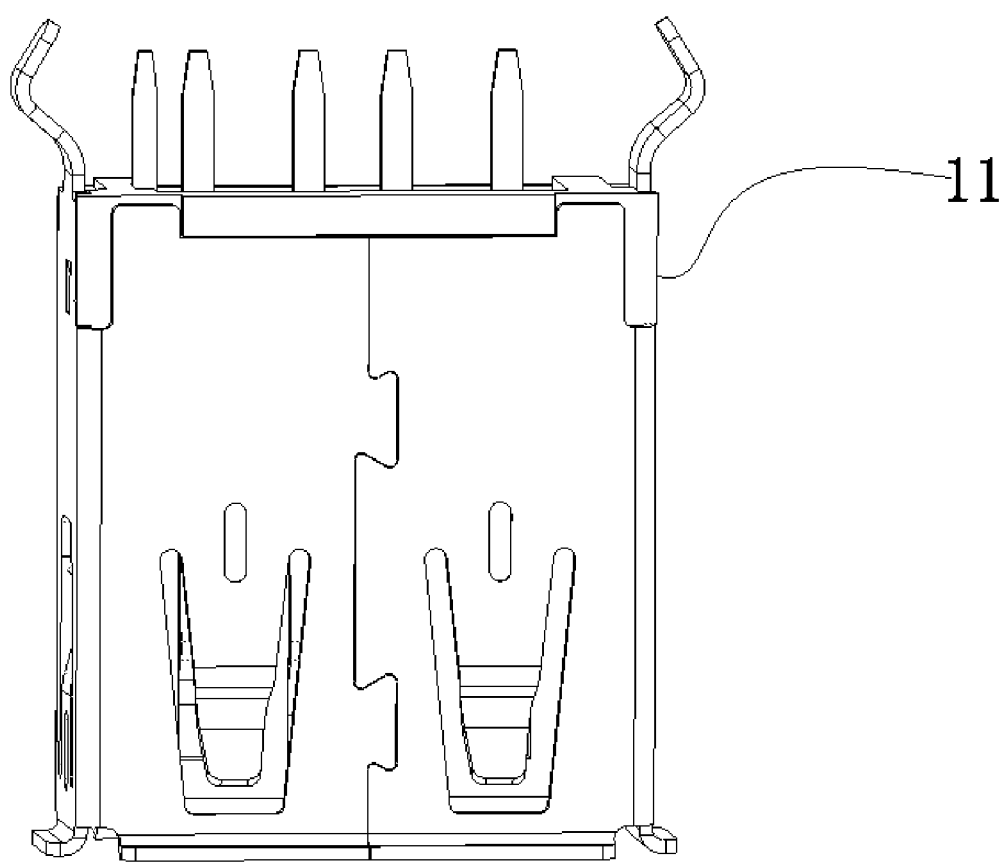
FIG. 7 is a structural schematic diagram of another USB socket disclosed by the present invention.

The USB socket of the present invention further includes a tongue core, the tongue core has 5 grooves, each groove is provided with a pin. Preferably, as shown in FIG. 7, when viewed from right to left, the 5 pins are respectively a positive electrode pin of the power supply, a negative voltage data pin, a positive voltage data pin, a grounding pin, and a control pin.

Figure 8:
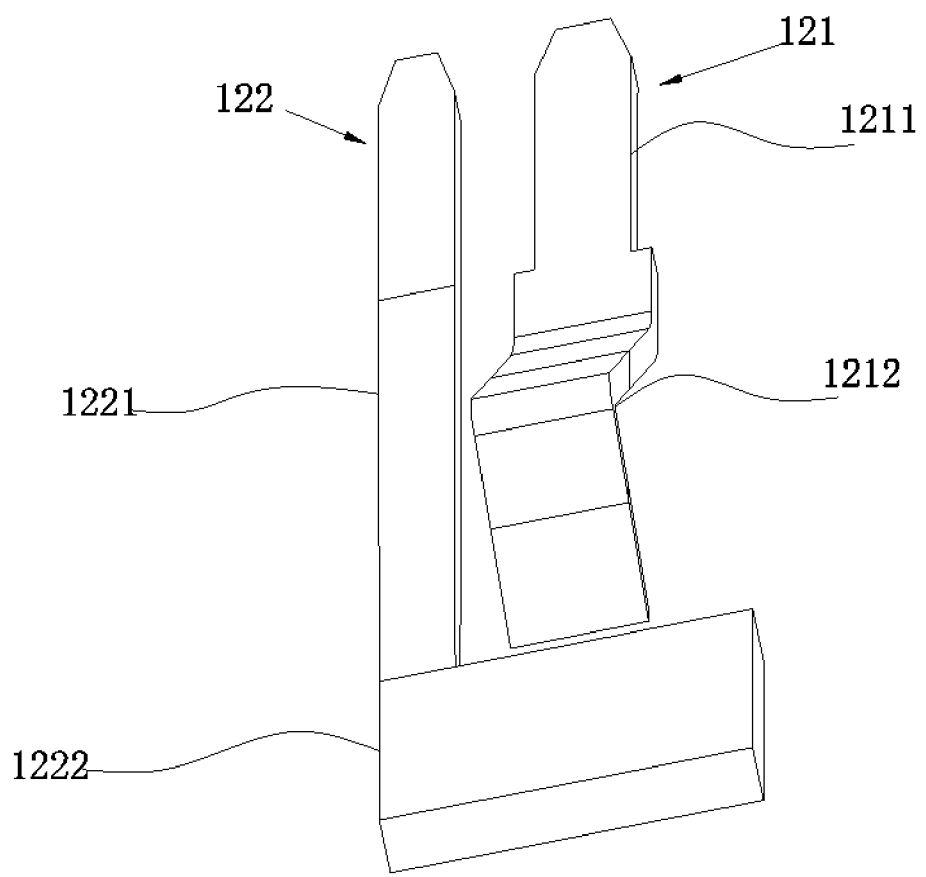
FIG. 8 is a structural schematic diagram of a control pin and a grounding pin in a suspended state in the present invention.

As shown in FIG. 8, in the present invention, the control pin includes a head portion 1222 and a pin portion 1221, wherein the width of the head portion 1222 of the control pin is larger than that of the pin portion 1221 of the control pin, and the head portion 1222 of the control pin is partially hidden in the tongue core and is partially exposed from a front end of the tongue core. In this way, the head portion 1222 of the control pin can reduce the contact between the head portion and a foreign matter, thereby reducing the probability of occurrence of short circuit or poor contact of the head portion, and thus the use safety and stability of the USB socket of the present invention are improved.

As shown in FIG. 8, the head portion 1222 of the control pin is located below the grounding pin 121. Preferably, the grounding pin 121 includes a spring leaf 1212 and a pin portion 1211. The spring leaf 1212 of the grounding pin is in a relative suspended state with the head portion 1222 of the control pin in the case that no external USB male plug is inserted, and the spring leaf 1212 of the grounding pin is in contact with the head portion 1222 of the control pin due to the extrusion of the external USB male plug in the case that the external USB male plug is inserted.

In some embodiments, the USB socket of the present invention further includes a USB circuit, wherein the structure of the USB circuit can be as shown in FIG. 2. In this way, when the head portion of the control pin is in contact with the spring leaf, the head portion of the control pin generates a low-level signal, so that the PNP transistor outputs an enable signal to the enable pin of the control chip, and then controls to turn on the control chip, as a result, the power circuit supplies power; when the head portion of the control pin is in the relative suspended state with the spring leaf, the enable pin of the control chip is disconnected, and then the power circuit does not supply power.

By means of the control pin, the USB socket of the present invention can be in a power-off state in the case that no external USB male plug is inserted, thereby saving energy and extending the service life of the USB socket. On the other hand, since the control pin of the present invention generates the low-level signal, it is more safe to use.

Based on the disclosure and teachings of the foregoing specification, those skilled in the art to which the present invention belongs can also make changes and modifications to the above embodiments. Therefore, the present invention is not limited to the specific embodiments disclosed and described above, and some modifications and changes to the present invention should also fall within the scope of the claims of the present invention. In addition, although some specific terms are used in the specification, these terms are only for the convenience of explanation and do not constitute any limitation to the present invention.

The invention claimed is:

1. A USB socket applied to a sofa, wherein the USB socket comprises:
   a USB female socket, wherein the USB female socket comprises a tongue core, and the tongue core comprises 5 pins, and a fifth pin contained in the tongue core is an ID pin; and
   a USB circuit, wherein the USB circuit comprises a power circuit, a filter circuit, a control chip and a step-down chopper circuit, and the step-down chopper circuit comprises a transistor, and the ID pin is electrically connected with the transistor.

2. The USB socket according to claim 1, wherein the filter circuit is a π-type filter circuit composed of an inductor and a capacitor.

3. The USB socket according to claim 2, wherein transient diodes are arranged at both ends of the filter circuit.

4. The USB socket according to claim 1, wherein the control chip comprises an enable pin, and the transistor is a PNP transistor, and wherein an emitter of the PNP transistor is electrically connected with the enable pin, a base of the PNP transistor is electrically connected with the ID pin, and a collector of the PNP transistor is used for grounding.

5. The USB socket according to claim 1, wherein the power circuit is used for electrically connecting with an external adapter or a power supply battery, and the external adapter or the power supply battery is used for supplying power to the power circuit.

6. The USB socket according to claim 1, wherein the power circuit comprises a diode and a fuse.

7. The USB socket according to claim 5, wherein a supply voltage of the power supply battery is 30V.

8. The USB socket according to claim 1, wherein the USB socket is applied to a smart sofa hand controller.

9. The USB socket according to claim 1, wherein the USB female socket further comprises an outer shell, and the outer shell surrounds the tongue core; and
   the ID pin comprises a head portion and a pin portion, and the pin portion is electrically connected with the control chip; when a USB male plug is inserted into the USB female socket, the head portion is in contact with an adjacent pin of the ID pin, and the pin portion is electrically connected with the transistor.

10. The USB socket according to claim 9, wherein the tongue core is provided with a groove, and the head portion is embedded in the groove.

11. The USB socket according to claim 9, wherein the adjacent pin is a GND pin.

12. The USB socket according to claim 9, wherein the head portion is partially exposed from a front end of the tongue core.

13. The USB socket according to claim 9, wherein the adjacent pin comprises a spring leaf, and when the USB male plug is inserted into the USB female socket, the head portion is in contact with the spring leaf.

14. The USB socket according to claim 13, wherein the spring leaf is arranged above the head portion.

* * * * *